No. 718,539. PATENTED JAN. 13, 1903.
H. P. SMITH.
REVERSIBLE BRIDLE BIT.
APPLICATION FILED APR. 14, 1902.
NO MODEL.
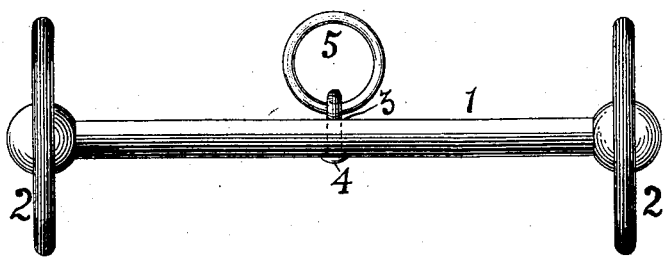
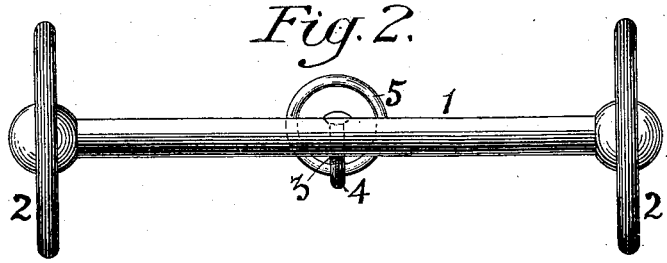
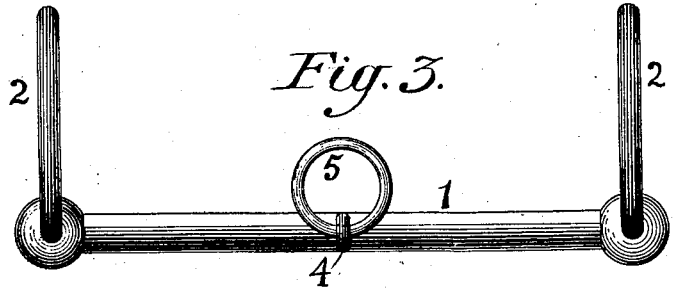
Witnesses:
Henry P. Long.
Sherman W. Barber.
Inventor.
Henry P. Smith
By Obed C. Billman
His Atty.

UNITED STATES PATENT OFFICE.

HENRY P. SMITH, OF CANAAN, OHIO.

REVERSIBLE BRIDLE-BIT.

SPECIFICATION forming part of Letters Patent No. 718,539, dated January 13, 1903.

Application filed April 14, 1902. Serial No. 102,813. (No model.)

*To all whom it may concern:*

Be it known that I, HENRY P. SMITH, a citizen of the United States, residing at Canaan, in the county of Wayne and State of Ohio, have invented certain new and useful Improvements in Reversible Bridle-Bits, of which the following is a specification.

My invention relates to that class of inventions known as "bridle-bits;" and the object of my invention is to produce an improved reversible bridle-bit of this class which will be simple in construction and better suited to its intended purposes than any other device of the same class with which I am acquainted.

The invention is especially designed for use on horses having the habit of "lolling" out their tongues or disposed to form such a habit, and is designed, by reason of its novel construction and the different positions to which it may be adjusted, to cure the habit or effectually prevent the formation of such a habit. It is furthermore admirably adapted for use on horses difficult to manage or control.

With this end in view the invention consists in the novel construction hereinafter described, illustrated in the accompanying drawings, and particularly pointed out in the appended claims.

Referring now to the drawings forming a part of this specification, Figures 1, 2, and 3 are plan views of the bit and designate, respectively, the three different positions to which the bit may be adjusted or brought to assume in the mouth of the animal.

Similar numerals of reference indicate like parts throughout all the figures of the drawings.

In the drawings, 1 designates the usual cross-bar, to the ends of which there are pivotally mounted or secured the bridle-rings 2. At the center of the bar 1, intermediate the ends thereof, there is formed an opening 3, adapted to receive a swivel 4, mounted therein.

5 designates a small auxiliary ring passing through the eye of the swivel 4 and held in a substantially horizontal position parallel with the line of the plane of the bar 1. It will thus be seen that the ring 5 will always rest forwardly on the tongue of the animal in any of the three different positions of the bit, as shown.

If the animal is not very hard in the mouth and is only commencing the habit of lolling the tongue, the bit is used in the position shown in Fig. 1. In this position it will be seen that the swivel and ring lie and extend forwardly in a direct horizontal line with the plane of the tongue of the animal. This is therefore the easier position. If this position of the bit proves ineffective or if the habit of the animal is of a more chronic character, the bit is reversed to the position shown in Fig. 2. In this position it will be seen that the swivel is brought to assume a position beneath and to the rear of the bar 1, and the ring 5 rests beneath the same, as shown, and upon the tongue of the animal.

If the animal is very hard in the mouth and difficult to manage and is inclined to grasp the bit between the teeth, the bit is reversed to the position shown in Fig. 3. In this position it will be seen that the swivel 4 is brought to assume a position above the bar 1, and the ring 5 will rest upon the same and the front portion thereof on the tongue of the animal. This will prevent the animal from grasping the bit with the teeth. In this position it also makes a very severe bit, so that the most vicious horse may be easily controlled.

When the bit is being used in the position shown in Fig. 1 of the drawings and it is desired to use the same in the position shown in Fig. 2 of the drawings, the bridle-rings are unbuckled and detached from the bridle-straps and the rings reversed, which will bring the bar in the position shown in Fig. 2, and the bridle-rings may then be fastened, as before.

When it is desired to change from the position just described to that shown in Fig. 3 of the drawings, the bridle-rings are detached from the bridle-straps, but are not reversed, and the bar carrying the rings in the same position is reversed or turned end for end, which will bring the same in the position shown in Fig. 3 of the drawings, and the bridle-rings may be fastened, as before.

It will be observed that the various positions to which the bit may be adjusted, as shown and described, are brought about by the specific manner in which the bridle-rings and swivel are mounted in the cross-bar.

Having thus described my invention, what I claim, and desire to secure by Letters Patent, is—

1. In an adjustable bridle-bit, the combination with a suitable cross-bar carrying in its ends bridle-rings; of a swivel provided with an eye mounted at the center of said cross-bar, and an auxiliary ring mounted in the eye of said swivel.

2. A bridle-bit, consisting of a suitable cross-bar, bridle-rings pivotally mounted in the ends thereof, a swivel provided with an eye carried by and mounted at the center of said cross-bar, and an auxiliary ring carried by and pivotally mounted in the eye of said swivel.

In testimony whereof I have affixed my signature in presence of two witnesses.

HENRY P. SMITH.

Witnesses:
JOHN ZURING,
JOSEPH O. FRITZ.